United States Patent [19]

Yamamori et al.

[11] Patent Number: 5,134,197
[45] Date of Patent: Jul. 28, 1992

[54] HYDROLYZABLE SILICONE RESIN COMPOSITION, PREPARATION METHOD AND COATING COMPOSITION CONTAINING THE SAME

[75] Inventors: Naoki Yamamori; Hiroharu Ohsugi; Koichi Fukuda; Akio Harada, all of Osaka, Japan

[73] Assignee: Nippon Paint Co., Inc., Osaka, Japan

[21] Appl. No.: 457,940

[22] Filed: Dec. 27, 1989

[30] Foreign Application Priority Data

Dec. 29, 1988 [JP] Japan .................. 63-333987

[51] Int. Cl.$^5$ .............................. C08F 8/00
[52] U.S. Cl. .................. 525/100; 525/446; 525/475; 528/26
[58] Field of Search .......... 525/446, 100, 475; 528/26

[56] References Cited

U.S. PATENT DOCUMENTS 3,152,999 10/1964 Rust et al. .................. 528/26

Primary Examiner—Melvyn I. Marquis
Attorney, Agent, or Firm—Wenderoth, Lind & Ponack

[57] ABSTRACT

The invention relates to a novel hydrolyzable silicone resin composition comprising a polysiloxane having at least one polyvalent metal ester group represented by either one of the following formulae:

$$(-COO-)_m-M-(R_2)_n$$

$$-R_1-COO-)_m-M-(R_2)_n$$

$$-R_1-(CH_2)_p-\underset{\underset{NH_2}{|}}{CH}-(CH_2)_q-COO-)_m-M-(R_2)_n$$

in which $R_2$ is a hydroxyl group, an alkoxyl group, an alkyl group, a halogen or oxygen atom; $R_1$ is a bivalent organic residue; p and q each is 0 or an integer of 1 to 8; m is an integer of 2 or more; n is 0 or an integer of 1 or more, providing that the sum of m and n is equal to the valence number of metal M; and M is a bivalent to tetravalent metal selected from the group consisting of Ti, Al, Mg, Zn, Pb, Zr, Cu, Ni, Co and Sn, its preparation and coating composition containing the same, which is useful in an antifouling paint.

19 Claims, No Drawings

HYDROLYZABLE SILICONE RESIN COMPOSITION, PREPARATION METHOD AND COATING COMPOSITION CONTAINING THE SAME

FIELD OF THE INVENTION

The present invention relates to a novel class of hydrolyzable silicone resin compositions and a method of preparation thereof. The invention also concerns a coating composition based on said silicone resin composition.

BACKGROUND OF THE INVENTION

Since silicone resin has a water repellent characteristics, such silicone resin itself or its mixture with wax, silicone oil, lubricants or the like have been used as coating materials for various substrates exposed to the sea and which are liable to be damaged thereby, i.e. by the sea or sea life, e.g. plants, etc., which have deleterious effects on the coated substrates. However, in natural surroundings, the water repellent effect of such silicone resin gradually disappears and long lasting repellent effects cannot be expected, especially when exposed to the sea. Even when one attempts to recoat substrates coated with such silicone resin composition, there is the problem of inferior adhesion of the silicone resin composition to the previously applied silicone resin coating. For these reasons, none of the silicone based antifouling paints have been used practically on ships, submarine structures and the like. The reason why the antifouling effects of these paints cannot last long is believed as follows: Such active additives as wax, silicone oil, lubricant and the like are easily dissolved out in sea water and are leached from the coating in a comparatively short period of time. It is, therefore, an object of the invention to provide a novel silicone resin composition capable of forming a coating which is gradually hydrolyzed or decomposed at an appropriate speed in sea water, and which contains an active antifouling agent that is gradually released from the coated surface to prevent adhesion of the harmful sea life upon the coated surface. An additional object of the invention is to provide a novel silicone base coating composition which can form an effective and durable antifouling coat on ships, submarine structures and the like and which is excellent in recoatability. A further object of the invention is provide an attractive method for the preparation of such coating. Other objects of the invention shall be clear from the statements of this specification and claims.

SUMMARY OF THE INVENTION

According to the invention, the abovementioned objects can be attained by providing a hydrolyzable silicone resin composition comprising a polysiloxane having at least one polyvalent metal ester group represented by either one of the following formula:

$(-COO-)_m-M-(R_2)_n,$ $-R_1-COO-)_m-M-(R_2)_n$ and

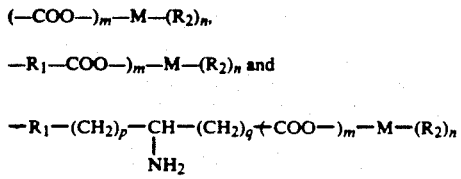

in which $R_2$ is hydroxyl group, alkoxyl group, alkyl group, halogen or oxygen atom; $R_1$ is a bivalent organic residue; p and q each is 0 or an integer of 1 to 8; m is an integer of 2 or more; n is 0 or an integer of 1 or more, providing that the sum of m wherein n equals to valence number of metal M; and M is a bivalent to tetravalent metal selected from the group consisting of Ti, Al, Mg, Zn, Pb, Zr, Cu, Ni, Co and Sn. The invention and also relates to a coating composition containing, as a resinous vehicle, the abovementioned hydrolyzable silicone resin composition.

The present hydrolyzable resin is the bound material of (a) a polyvalent metal salt of hydroxyl group containing an organic acid or a resin having end hydroxyl groups and containing as a repeating unit a polyvalent metal salt of organic acid, and (b) a polysiloxane compound.

The term "bound material" as used herein shall denote a high molecular weight compound in which the (a) component and (b) component are alternately connected to each other by chemical bond and a high molecular weight compound in which a blocked (a) component unit and a blocked (b) component unit are connected with each other. This bound material is not limited by the type of starting materials used, and shall include similar high molecular weight compounds prepared by using starting materials other than (a) and (b), providing the resulted compound, as a whole, contains the portion recognizable as an (a) component and a portion recognizable as an (b) component. Therefore, the present coating composition may take be a two component composition, a one component material containing (a) or one constituent materials for the aforementioned hydrolyzable silicone resin and the other component containing (b) or the other constituent material for said silicone resin.

The hydrolyzable silicone resin of this invention includes in its molecule a number of organic acid polyvalent metal salt portions and polysiloxane portions, and can result in a coating which is stable and tough in a non-ionic atmosphere. However, in an ionic atmosphere as in sea water, the thus obtained coating is gradually hydrolyzed and decomposed at the abovementioned metal salt portions, generating and liberating polysiloxane having a comparatively low molecular weight compared with that of the silicone oil. Thus, the present hydrolyzable silicone resin is a novel and unique type of a modified silicone resin.

As mentioned previously, such unique hydrolyzable silicone resin coating may be obtained by using a coating composition comprising the hydrolyzable silicone resin previously synthesized and an appropriate diluent, or by using a two component coating composition each component comprising an appropriate intermediate or starting material and reacting the applied materials with each other on the surface of substrate, thereby forming the hydrolyzable silicone resin, in situ. Incidentally, the term "hydrolyzable silicone resin coating" or "a resin coating mainly of hydrolyzable silicone resin" as used herein shall denote the coating which may include, besides the main hydrolyzable silicone resin component, such additives as waxes, silicone oils, lubricants, pigments and other resins. The present hydrolyzable silicone resin may be advantageously prepared by either one of the following reactions:

(1) A polycondensation of a polyvalent metal salt of a hydroxyl group containing organic acid of the formula:

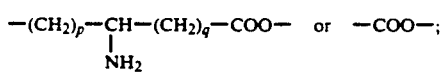 (I)

wherein $R_1$ is a bivalent organic residue; Y is $$-(CH_2)_p-\underset{\underset{NH_2}{|}}{CH}-(CH_2)_q-COO- \text{ or } -COO-;$$

p and q each is 0 or an integer of 1 to 8; $R_2$ is selected from the group consisting of a hydroxyl group, an alkoxy group, an alkyl group, a halogen and oxygen atom; n is 0 or an integer of 1 or more; m is an integer of 2 or more, providing that the sum of m and n is equal to the valence number of the metal M; and M stands for a bivalent to tetravalent metal selected from the group consisting of Ti, Al, Mg, Zn, Pb, Zr, Cu, Ni, Co and Sn, with a polysiloxane compound represented by the formula:

 (III)

in which R is hydrogen an alkyl group; $R_4$ is a $C_2$ to $C_{18}$ hydrocarbon residue, an ether-bond containing $C_2$ to $C_{18}$ hydrocarbon residue, or an ester-bond containing $C_2$ to $C_{18}$ hydrocarbon residue; $R_5$ and $R_6$ are the same or different substituents and each represents hydrogen, $C_1$ to $C_8$ alkyl, alkoxy or aryl group; r is 0 or 1 and s is an integer of 2 to 500.

Most of the polyvalent metal salts of hydroxyl group containing organic acids used in this method are known compounds and easily available at the market. However, if necessary, they may be easily prepared by the reaction of hydroxyl group containing organic acid of the formula:

$$HO-R_1-Y-H \quad (IV)$$

in which $R_1$ is a bivalent organic residue as, for example, an organic residue of the formula:

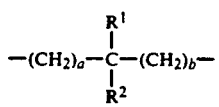

(wherein $R^1$ and $R^2$ each represents hydrogen atom, an alkyl group having 1 to 10 carbon atoms or an alkene group having 2 to 10 carbon atoms; and a and b each represents 0 or an integer of 1 to 16) or an organic residue of the formula:

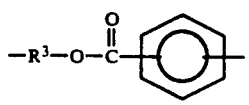

(wherein $R^3$ represents an alkylene having 1 to 8 carbon atoms or an alkylene having 4 to 8 carbon atoms and containing ether bond);

Y is $$-(CH_2)_p-\underset{\underset{NH_2}{|}}{CH}-(CH_2)_q-COO- \text{ or } -COO-$$

(wherein p and q each is 0 or an integer of 1 to 8) as, for example, lactic acid, glycolic acid, 2-hydroxy isobutyric acid, 3-hydroxy butyric acid, 16-hydroxy hexadecanoic acid, 2-hydroxy-2-methyl butyric acid, hydrocarylic acid, 12-hydroxy stearic acid, ricinolic acid, monohydroxy alkyl phthalic acid, various other hydroxy sulfonic acids, hydroxyamino acids, hydroxy phosphonic acids and the like, with an oxide, hydroxide, halide, or organic acid salt of bivalent to tetravalent metal selected from the group consisting of Ti, Al, Mg, Zn, Pb, Zr, Cu, Ni, Co and Sn or $C_1$ to $C_{10}$ organic acid metal salts.

The other starting material of the polysiloxane compound of the formula (III) can be easily prepared by various known methods as, for example, the self-condensation of dialkoxysilane as dialkoxy dialkylsilane, dialkoxy diphenyl silane and the like, condensation of a dialkoxy silane compound with alcohol, polyol or hydroxy organic acid, and ring-opening polymerization of cyclic siloxane compound and the like. If desired, polysiloxane may be condensed with an appropriate diol compound.

The reaction of the polyvalent metal salt of end hydroxyl group containing organic acid (I) and polysiloxane compound having hydroxyl group and more preferably alkoxy group, (III) can be very easily carried out, if desired in a solvent and in the presence of catalyst, at room temperatures to give the desired bound material of said polysiloxane compound and said polyvalent metal salt of hydroxyl group containing organic acid, in which the silicon atom of said siloxane compound and carbon atom of said organic acid are bonded through an ether bond.

In this invention, the hydrolyzable silicone resin is previously made according to the abovementioned reaction and the thus obtained resin may be used as a resinous vehicle in a coating composition. Alternatively, the above-mentioned starting materials each is a separate component in a 2 component coating composition, and the abovementioned reaction may be carried out in the applied coating, thereby forming the desired hydrolyzable silicone resin in situ.

(2) A polycondensation of a polyester resin having end hydroxyl groups and having in its main chain a repeating unit of organic acid polyvalent metal salt of the formula:

$$(-R_1-Y)_m-M-(R_2)_n \quad (III)$$

(in which $R_1$ is a bivalent organic residue; Y is $$(CH_2)_p-\underset{\underset{NH_2}{|}}{CH}-(CH_2)-COO- \text{ or } COO-;$$

p and q each represent 0 or an integer of 1 to 8; $R_2$ is a hydroxyl group, an alkoxy group, an alkyl group, a halogen or oxygen atom, n is 0 or an integer of 1 or more, m is an integer of 2 or more providing that the sum of m and n is equal to the valence number of the metal M; and M is bivalent to tetravalent metal selected from the group consisting of Ti, Al, Mg, Zn, Pb, Zr, Cn, Ni, Co and Sn with a polysiloxane compound of the formula:

(in which R, $R_4$, $R_5$, $R_6$, r and s each has the same meanings as defined above).

The polyester resin having end hydroxyl group having in its main chain a repeating unit of the formula:

may be easily obtained, according to the method stated in Japanese Patent Application Sho 56-165922, by effecting a heat-condensation of a polyhydric alcohol component comprising the hydroxy organic acid metal salt of the formula:

(in which $R_1$, Y, $M_1$, $R_2$, m and n each has the same meanings as defined herein before) or a mixture of said hydroxy organic acid metal salt (I) and polyol, and a polybasic acid component at a temperature which is lower than the decomposition temperature of the hydroxy organic acid metal salt, or, according to the method stated in Japanese Patent Application Sho 58-196900, by reacting a comparatively low molecular weight polyester resin having a resinous acid value of 5-150, and an oxide, hydroxide, chloride or inorganic acid salt of the desired metal and optionally controlling the end groups with a diol compound, metal hydroxide and the like.

Thus, in the present invention, the polycondensation product of a polyester resin having end hydroxyl groups having in its main chain a repeating unit of polyvalent metal salt of organic acid and a polysiloxane of the formula (III) may be used as it is or the same product may be formed on the surface of substrate by applying a two component coating composition each component containing the respective starting material and effecting the polycondensation in the applied coating.

(3) A polycondensation of an acrylic resin having in its side chains end hydroxyl groups and a repeating unit of the formula:

(in which $R_1$, Y, M, $R_2$, m and n each has the same meanings as defined above) and a polysiloxane compound of the formula:

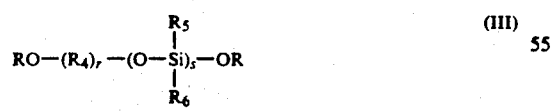

(in which R is hydrogen or alkyl group; $R_4$ is a $C_2$-$C_{18}$ hydrocarbon residue, an ether bond containing $C_2$-$C_{18}$ hydrocarbon residue or an ester bond containing $C_2$-$C_{18}$ hydrocarbon residue; $R_5$ and $R_6$ are the same or different substituents and each represents hydrogen, $C_1$-$C_8$ alkyl group, alkoxy group, or aryl group i r is 0 or 1 and s is an integer of 2 to 500)

The acrylic resin having in its side chains an end hydroxyl group and a repeating unit of an organic acid polyvalent metal salt of the formula (II) may be easily prepared, according to the methods stated in Japanese Patent Application Nos. Sho 60-106434, 60-224168 and 60-251784, by the reaction of an acrylic resin having end carboxyl group, sulfonic acid group or phosphonic acid group, an oxide, hydroxide, halogenide or inorganic acid salt of the desired metal, and a hydroxy organic acid at an elevated temperature. This type of hydrolyzable silicone resin may be used as the resin itself previously synthesized or may be formed on the surface of substrate by applying a two component coating composition, each component containing said acrylic resin or said polysiloxane compound, and reacting these materials in the applied coating.

(4) A method for reacting, at an elevated temperature, an end carboxyl group containing modified silicone resin obtained the reaction of a polysiloxane compound of the formula:

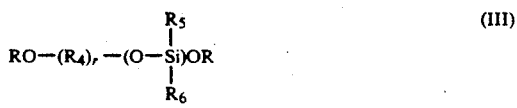

(in which R is hydrogen or alkyl group; $R_4$ is a $C_2$-$C_{18}$ hydrocarbon residue, an ether bond containing $C_2$-$C_{18}$ hydrocarbon residue or an ester bond containing a $C_2$-$C_{18}$ hydrocarbon residue; $R_5$ and $R_6$ are the same or different substituents and each represents hydrogen, a $C_1$-$C_8$ alkyl, an alkoxy or an aryl group; r is 0 or 1 and s is an integer of 2-500) and a hydroxy organic acid of the formula:

(in which $R_1$ is a bivalent organic residue and Y is

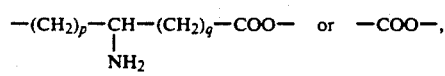

p and q each represents 0 or an integer of 1 to 8) with an oxide, hydroxide, alkoxide, halide or inorganic acid salt of a bivalent to tetravalent metal selected from the group consisting of Ti, Al, Mg, Zn, Pb, Zr, Cu, Ni, Co and Sn, and (5) A method for reacting, at an elevated temperature, an end carboxyl group containing a modified silicone resin obtained by the polycondensation of a dialkoxy silane compound of the formula:

(in which R is alkyl; $R^1$ may be the same or different and each is hydrogen, alkyl or aryl group) and a hydroxy organic acid of the formula:

(in which $R_1$ is a bivalent organic residue, and Y is

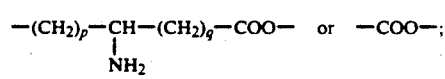

p and q each represents 0 or an integer of 1 to 8) with an oxide, hydroxide, alkoxide, halide or inorganic acid salt of bivalent to tetravalent metal selected from the group consisting of Ti, Al, Mg, Zn, Pb, Zr, Cu, Ni, Co, and Sn.

Regardless of the methods used, the present hydrolyzable silicone resin thus obtained includes in its molecule, an organic acid polyvalent metal salt portion represented by the formula:

$$-R_1-Y)_m-M-(R_2)_n \qquad (II)$$

(in which $R_1$ is a bivalent organic residue, Y is $$-(CH_2)_p-\underset{\underset{NH_2}{|}}{CH}-(CH_2)_q-COO- \text{ or } -COO-,$$

p and q each represents 0 or an integer of 1 to 8; $R_2$ is a hydroxyl group, an alkoxy group, an alkyl group, a halogen or an oxygen atom; n is 0 or an integer of 1 or more; m is an integer of 2 or more, providing that the sum of m and n is equal to the valence number of the metal M; and M is a bivalent to tetravalent metal selected from the group consisting of Ti, Al, Mg, Zn, Pb, Zr, Cu, Ni, Co, and Sn) and a polysiloxane compound residue of the formula:

$$-O-(R_4)_r-(O-\underset{\underset{R_6}{|}}{\overset{\overset{R_5}{|}}{Si}})_s-O-$$

(in which $R_4$ is a hydrocarbon residue having 2 to 18 carbon atoms, a hydrocarbon residue having 2 to 18 atoms and containing an ether bond or a hydrocarbon residue having 2 to 18 carbon atoms and containing an ester bond; $R_5$ and $R_6$ are the same or different substituents and each is selected from the group consisting of hydrogen, a $C_1$-$C_8$ alkyl, an alkoxy and aryl groups; r is 0 or 1 and s is an integer of 2-200), and when forming a coating, it remains keeping a stable and a rigid film is formed in a non-ionic atmosphere. However, when it is exposed to an ionic atmosphere as in a weakly alkaline sea water, the ester bond between said metal and organic acid is easily hydrolyzed and thus, the resin is gradually decomposed, generating a polysiloxane derivative (i.e. polysiloxane coupled with organic acid) or polysiloxane compound itself, as well as the metal ions.

Such a polysiloxane compound is originally designed so as to have the number(s) of SiO repeating unit of 2-200 which is within the range of the so-called silicone oil, and therefore, with the progress of hydrolysis of said coating, a water repellent silicone oil can be newly produced in proportion thereto.

Thus, in the present invention, the coating surface is always covered with an amount of freshly generated silicone oil throughout the period life from the beginning to the end of hydrolysis when all of the coating has disappeared and hence, a constant, long-lasting antifouling effect can be espected therewith. There is also an additional advantage such the adhesion properties of the coating composition is excellent and in an actual re-coating, there is no fear of occurrence of peeling between the originally applied coating and newly applied one.

As already stated, the present hydrolyzable silicone resin composition is very useful as a resinous vehicle in a coating composition, and such coating composition may be formulated in either a one component or a two component composition form as desired.

Since the coating is gradually hydrolyzed and decomposed in an ionic atmosphere, liberating an amount of silicone oil constantly throughout the life of the coating, the present resin composition and coating composition are likewise useful, besides in an antifouling paint, in various technical fields requiring a constant supply of fresh silicone oil in an ionic atmosphere, as in automobile paint, certain household and industrial instrument paints or the like.

If desired, known antifouling agents, bactericides, agriculture chemicals or the like may be added to the present coating to obtain both water repellent and antifouling effects or other known water repellent waxes, silicone oils, lubricants, or the like may be added in an amount of up to 30 wt % (so as not to affect the recoatability of the coating composition) to produce additional properties therein.

The present resinous composition can thus afford a unique hydrolyzable coating which is very useful in various technical fields.

However, similar effects can be expected with a combination of the present resin composition and other known coating resins.

The amount of the present resin composition in such combination may be widely varied depending on the intended objects and use. However, in the case of an antifouling paint, it is possible to obtain water repellent effects with such combination containing 10 wt % or more of the present hydrolyzable silicone resin.

For a long-lasting water repellent effect, it is recommended that the content of the hydrolyzable resin be 30 wt % or more, more preferable 45 wt % or more.

The invention shall be now more fully explained in the following Examples. Unless otherwise being stated, all parts and % are by weight.

For the obtainment of such resinous coating, various coating compositions are provided in this invention.

EXAMPLE 1

Into a 4-necked flask fitted with a condenser, a stirrer and a nitrogen gas inlet tube, was placed 900 parts of α, ω-bis(3-aminopropyl) polydimethyl siloxane (X-22-161AS, trademark, Shinetsu Kagaku K.K.), 201 parts of nickel diacrylate and 2,045 parts of xylene and the mixture was reacted under stirring at 140° C. for 10 hours to obtain a highly viscous, clear green resin varnish (A). To this, methanol was added and the thus formed condensate was separated, washed with acetone and replaced with n-hexane to obtain polydimethyl siloxane in a 97% yield. IR analysis of the purified resin revealed that there was no absorption of an acryloyl group at 1,640 cm. By GPC analysis, it was found that the molecular weight distribution of the resin was markedly shifted to a high molecular weight side as compared with that of polydimethyl siloxane used as a raw material. Number average molecular weight of this resin was 1,900.

EXAMPLE 2

500 parts of α,ω-bis(ω-hydroxyalkyl) polydimethyl siloxane (X-22-160AS, trademark of Shinetsu Kagaku K.K.) and 74 parts of phthalic anhydride were mixed together and reacted at 135° C. for 2 hours to obtain a half ester of polydimethyl siloxane phthalic acid (B).

Into a reaction flask fitted with a reflux condenser, were placed 574 parts of said (B), 49 parts of copper hydroxide and 155 parts of xylene and while refluxing xylene, dehydration reaction was continued for 3 hours until 12 cc of water were collected. A highly viscous, green colored resin varnish (B) was obtained. The similar purification was carried out as in Example 1 to obtain the product in about 80% yield. From the GPC analysis, it was found that number average molecular weight of this resin was 2,000.

EXAMPLE 3

Into a 4-necked flask fitted with a condenser, a stirrer, a nitrogen gas inlet tube and a decanter, was placed 500 parts of $\alpha,\omega$-bis($\omega$-hydroxy alkyl) polydimethyl siloxane (X-22-160AS, trademark, Shinetsu Kagaku K.K.) and 74 parts of phthalic anhydride, and the mixture was reacted at 135° C. for 2 hours to obtain half-ester of polydimethyl siloxane phthalic acid (C).

Next, 574 parts of (C), 330 parts of Cu 12-hydroxy stearate, 5 parts of DBTO (dibutyl tin oxide) and 48 parts of xylene was placed in a flask and reacted at 165° C. for 3 hours until 3 cc of water were recovered. Thus, a highly viscous green waxy resin (varnish C) was obtained. The purified resin was subjected to GPC and it was found that number average molecular weight of this resin was 1,300.

EXAMPLE 4

Into a similar reaction vessel as used in Example 1, was placed 400 parts of $\alpha,\omega$-bis (methoxy) polydimethyl siloxane (methoxy equivalent 248), 252 parts of Zn diricinolate and 1,600 parts of xylene and the mixture was reacted at 8 hours for 120° C. to obtain a pale yellow clear resin solution (varnish D).

EXAMPLE 5

500 parts of $\alpha,\omega$-bis (methoxy) polydimethyl siloxane (methoxy equivalent 248), 190 parts of L-serine and 860 parts of xylene was placed in a reactor and reacted as in Example 1 to obtain a resin varnish (1). Next, 20 parts of Mn acetate were added and reacted, while removing acetic acid and solvent out of the system, under reflux conditions for 8 hours to obtain a resin varnish E.

EXAMPLE 6

The same procedures as stated in Example 5 were repeated excepting substituting 18 parts of Co acetate for 20 parts of Mn acetate, to obtain varnish F.

EXAMPLE 7

Into a reaction flask, was placed 500 parts of $\alpha,\omega$-bis (trimethoxy) polydimethyl siloxane (methoxy equivalent 390), 10 parts of dibutoxy dimethyl silane, 330 parts of 12-hydroxy stearic acid and 1,180 parts of xylene and the mixture was reacted at 140° C. for 6 hours to obtain a varnish (2). 2,000 parts of this varnish (2) and 140 parts of dibutyl tin oxide were then reacted at 120° C. for 10 hours to obtain a varnish (G).

EXAMPLE 8

100 parts of varnish (1), 6 parts of aluminium tris-(ethyl acetoacetate) and 4 parts of butanol were mixed together quickly, and thus obtained composition was applied onto a glass plate (50×50 mm) in an amount of about 1.5 g and dried at 100° C. for 4 hours to obtain a Test plate 8.

The same composition was applied onto an acryl plate (15×30 cm) in an amount of about 25 g and dried for 24 hours to obtain a coated plate (8).

EXAMPLE 9

100 parts of varnish (2) and 4 parts of titanium tris(isopropyl alcoholate) were quickly mixed and applied onto a glass plate (50×50 cm) in about 1.2 g to obtain a test plate (9) and onto an acryl plate (15×30 cm) in about 25 g to obtain a coated plate (9).

EXAMPLE 10

The same experiment as stated in Example 8 was repeated except that 4 parts of Mg di(butyl alcoholate) was substituted for 6 parts of aluminium tris(ethyl acetoacetate). Test plate (10) and coated plate (10) were prepared in the same way respectively.

EXAMPLE 11

32 parts of 3-aminopropyl-dimethoxy monomethyl silane, 18 parts of methacrylic acid and 120 parts of xylene were placed in a reaction vessel and the mixture was reacted at 140° C. for 8 hours. Next, 62 parts of dimethyl dimethoxy silane and 8 parts of monomethoxy trimethyl silane were added to the abovementioned reaction mixture and the combined mixture was reacted under refluxing conditions, while removing the formed methanol.

To 100 parts of the reaction mixture, 9 parts of aluminium tris (ethyl acetoacetate) was added and mixed quickly the and thus obtained composition was applied onto a glass plate and onto an acryl plate as in Example 8. In this way, a test plate (11) and coated plate (11) were prepared.

EXAMPLE 12

The same procedures as stated in Example 5 were repeated except for substituting 22 parts of zirconium acetate monooxide for 20 parts of manganese acetate to obtain varnish (H).

COMPARATIVE EXAMPLE 1

100 parts of $\alpha,\omega$-bis (methoxy) polydimethyl siloxane (methoxy equivalent 126), 25 parts of glycerine, 100 parts of xylene and 20 parts of n-butanol were mixed well to obtain a comparative varnish (A).

Hydrolysis test

Test plates 1, 7, 12 and Comparative test plate 1 were prepared by using the varnishes A G, H and Comparative varnish (A) of Examples 1, 7, 12 and Comparative Example 1 in the same way as stated in Example 8. That is, about 1.5 g of varnish were applied onto a glass plate (50×50 cm) and dried at 100° C. for 4 hours.

The thus obtained test plates were dipped in a buffer solution (pH=12.0) and maintained at 40° C. for 3 weeks. The weight loss of the respective coatings were measured. The test results are shown in Table 1.

TABLE 1

| Test plate | initial resin weight (g) | resin weight after 3 weeks (g) | weight loss (g) |
|---|---|---|---|
| 1 | 0.638 | 0.432 | 0.206 |
| 2 | 0.536 | 0.398 | 0.138 |
| 3 | 0.734 | 0.612 | 0.122 |
| 4 | 0.562 | 0.431 | 0.131 |
| 5 | 0.684 | 0.582 | 0.102 |
| 6 | 0.786 | 0.611 | 0.175 |
| 7 | 0.816 | 0.693 | 0.123 |
| 8 | 0.669 | 0.510 | 0.159 |
| 9 | 0.749 | 0.659 | 0.090 |
| 10 | 0.658 | 0.603 | 0.055 |
| 11 | 0.647 | 0.586 | 0.061 |
| 12 | 0.731 | 0.612 | 0.119 |

TABLE 1-continued

| Test plate | initial resin weight (g) | resin weight after 3 weeks (g) | weight loss (g) |
|---|---|---|---|
| Comp. 1 | 0.755 | 0.755 | 0 |

Antifouling test

Coated plates 1~7, 12 and Comparative coated plate 1 were prepared by using the varnishes A-G, H and Comparative varnish (A) of Examples 1~7, 12 and Comparative Example 1 in the same way as stated in Example 8. That is, about 25 g of varnish were applied onto an acryl plate (15×30 cm) and dried for 24 hours.

Separately, using the materials shown in Table 2, coating compositions were prepared, from which coated plates 13~19 and comparative coated plates 2~8 were prepared as in Example 8.

These coated plates were dipped into sea water at Aioy Bay, Hyogo Prefecture for 30 months and antifouling effects were evaluated from the surface area % adhered with submarine livings. The test results are shown in Table 3.

TABLE 2

| | Coated plate | | | | | | | Composite coated plate | | | | | | |
|---|---|---|---|---|---|---|---|---|---|---|---|---|---|---|
| | 11 | 12 | 13 | 14 | 15 | 16 | 17 | 2 | 3 | 4 | 5 | 6 | 7 | 8 |
| varnish | | | | | | | | | | | | | | |
| A | 90 | | | | | | | | | | | | | |
| B | | 85 | | | | | | | | | | | | |
| C | | | 85 | | | | | | | | | | | |
| D | | | | 90 | | | | | | | | | | |
| E | | | | | 90 | | | | | | | | | |
| F | | | | | | 85 | | | | | | | | |
| G | | | | | | | 98 | | | | | | | |
| Comp. varnish A | | | | | | | | 80 | | | | | | |
| ethylene vinyl acetate copolymer | | | | | | | | | 40 | | | | 40 | 40 |
| RTV rubber (SE-44, Shinetsu Kagaku) | | | | | | | | | | 40 | 45 | 30 | | |
| paraffin oil | 10 | | | | | | | 20 | | | | | | |
| vaseline | | 15 | 5 | | 5 | | | | | | | | | 10 |
| petrolatum | | | 10 | 5 | | | | | | | | | | 5 |
| wax | | | | 5 | | 10 | | | | | | 5 | | |
| silicone oil* | | | | | 10 | | 2 | | | | 10 | 5 | 10 | |
| xylene | | | | | | | | 50 | | 45 | 60 | 50 | 45 | |
| butanol | | | | | | | | 10 | | | | | | |
| toluene | | | | | | | | | 60 | | | | | |

*TSF 451-50 Toshiba Silicone

TABLE 3

| Coated Plate | months | | | | | | |
|---|---|---|---|---|---|---|---|
| | 3 | 6 | 9 | 12 | 18 | 24 | 30 |
| 1 | 0 | 0 | 0 | 0 | 0 | 0 | 5 |
| 2 | 0 | 0 | 0 | 0 | 0 | 0 | 0 |
| 3 | 0 | 0 | 0 | 0 | 0 | 0 | 10 |
| 4 | 0 | 0 | 0 | 0 | 0 | 0 | 5 |
| 5 | 0 | 0 | 0 | 0 | 0 | 0 | 10 |
| 6 | 0 | 0 | 0 | 0 | 0 | 0 | 15 |
| 7 | 0 | 0 | 0 | 0 | 0 | 0 | 5 |
| 8 | 0 | 0 | 0 | 0 | 0 | 0 | 10 |
| 9 | 0 | 0 | 0 | 0 | 0 | 0 | 10 |
| 10 | 0 | 0 | 0 | 0 | 0 | 5 | 20 |
| 11 | 0 | 0 | 0 | 0 | 0 | 0 | 0 |
| 12 | 0 | 0 | 0 | 0 | 0 | 0 | 0 |
| 13 | 0 | 0 | 0 | 0 | 0 | 0 | 0 |
| 14 | 0 | 0 | 0 | 0 | 0 | 0 | 0 |
| 15 | 0 | 0 | 0 | 0 | 0 | 0 | 0 |
| 16 | 0 | 0 | 0 | 0 | 0 | 0 | 0 |
| 17 | 0 | 0 | 0 | 0 | 0 | 0 | 0 |
| 18 | 0 | 0 | 0 | 0 | 0 | 0 | 5 |
| 19 | 0 | 0 | 0 | 0 | 0 | 0 | 0 |

| Comp. Coat. Plate | month | | | | | | |
|---|---|---|---|---|---|---|---|
| | 3 | 6 | 9 | 12 | 18 | 24 | 30 |
| 1 | 0 | 5 | 30 | 100 | 100 | 100 | 100 |
| 2 | 0 | 0 | 30 | 80 | 100 | 100 | 100 |
| 3 | 20 | 80 | 100 | 100 | 100 | 100 | 100 |
| 4 | 0 | 5 | 15 | 50 | 100 | 100 | 100 |
| 5 | 0 | 0 | 0 | 30 | 80 | 100 | 100 |
| 6 | 0 | 0 | 0 | 40 | 100 | 100 | 100 |
| 7 | 0 | 5 | 15 | 70 | 100 | 100 | 100 |
| 8 | 0 | 0 | 20 | 60 | 100 | 100 | 100 |

In coated plates 1~10, certain degree of sea life growth was discovered after 24 months, but such life did not adhere and was easily swept away in every case. Whereas, in the comparative coated plates, there was severe adhesion with sea life at from 6~12 months and later and the adhered sea life could not be removed from the coated plates even after 18 months.

Recoatability test

A part of the coated plates held in sea water in the abovementioned antifouling tests was taken out after a 6 months immersion period, and the same varnish originally applied was again applied on the respective plate and the thus recoated plates were dipped into sea water for an additional 6 months. 10 knife-cuts were given to the coating and inter-laminar peeling % was examined. Recoatability was evaluated from the following criteria.

| | |
|---|---|
| 0 | peeling, during dipping |
| 1 | 60~100% (inter-laminar peeling %) |
| 2 | 40~less than 60% |
| 3 | 20~less than 40% |
| 4 | less than 20% |
| 5 | no peeling |

Test results are shown in Table 4.

TABLE 4

| Coated Plate | Evaluation | Comp. Coat. Plate | Evaluation |
|---|---|---|---|
| 1 | 5 | 1 | 3 |
| 2 | 5 | 2 | 3 |
| 3 | 5 | 3 | 5 |
| 4 | 5 | 4 | 3 |
| 5 | 5 | 5 | 0 |
| 6 | 5 | 6 | 0 |
| 7 | 5 | 7 | 2 |
| 8 | 5 | 8 | 1 |
| 9 | 5 | | |
| 10 | 5 | | |

TABLE 4-continued

| Coated Plate | Evaluation | Comp. Coat. Plate | Evaluation |
|---|---|---|---|
| 11 | 4 | | |
| 12 | 4 | | |
| 13 | 4 | | |
| 14 | 4 | | |
| 15 | 4 | | |
| 16 | 4 | | |
| 17 | 5 | | |
| 18 | 5 | | |
| 19 | 5 | | |

EXAMPLE 13

400 parts of $\alpha,\omega$-bis (dicarboxy) polydimethyl siloxane (carboxyl equivalent 250), 252 parts of Zn diricinolate, 50 parts of xylene and 5 parts of dibutyl tin oxide were mixed together and the mixture was reacted at 190° C., while removing the formed water out of the system, for 10 hours. After cooling, 1,000 parts of xylene were added to obtain varnish (I). Coated plate (20) was prepared by using this varnish as in Example 8.

EXAMPLE 14

210 parts of $\alpha,\xi$-bis (dicarboxy) polydimethyl siloxane (carboxyl equivalent 480), 70 parts of zinc acetate and 50 parts of xylene were combined together and the mixture was reacted at 120° 160° C., while removing acetic acid out of the system, for 8 hours. After cooling, 500 parts of xylene were added to obtain varnish (J). Coated plate (21) was prepared by using this varnish as in Example 8.

EXAMPLE 15

The same experiment as stated in Example 14 was repeated excepting substituting 55 parts of Cu acetate for 70 parts of Zn acetate to obtain varnish. To this, 5 parts of aluminium tris (ethyl acetoacetate) and 10 parts of n-octanol were added and a coated plate (22) was prepared as in Example 8.

EXAMPLES 16~19 AND COMPARATIVE EXAMPLES 9~10

The materials shown in Table 5 were mixed together to obtain the coating compositions. From these compositions, coated plates (23)~(26) and comparative coated plates (9)~(10) were prepared as in Example 8.

EXAMPLE 20

Into a 4-necked flask fitted with a condenser, a stirrer and a nitrogen gas inlet tube, was placed 120 parts of 12-hydroxy stearic acid, 15 parts of xylene and 0.8 part of methanesulfonic acid and the mixture was reacted at 150° 180° C., while removing the formed water out of the system, for 9 hours. After completion of the reaction, 40 parts of xylene were added to obtain varnish (3) having an acid value of 25 mg KOH/g.

To this, 21 parts of $\alpha,\omega$-bis (methoxy) polydimethyl siloxane (methoxy equivalent 248) was added and the mixture was reacted at 120° C., while removing the formed methanol, for 4 hours.

Next, 16 parts of Co propionate were added and the mixture was reacted at 120°~145° C., while removing the formed propionic acid, for 6 hours. After cooling, 55 parts of xylene were added to obtain varnish (K) and a coated plate (27) was prepared therefrom.

EXAMPLE 21

Into a similar reaction vessel as used in Example 1, was placed 80 parts of xylene and 20 parts of n-butanol and maintained at 90° C. To this, was drop-wise added a mixture of 19 parts of acrylic acid, 21 parts of n-butyl methacrylate, 60 parts of ethyl acrylate and 2 parts of benzoyl peroxide in 3 hours and then the mixture was maintained at 90° C. for 2 hours to obtain varnish (4).

Into the similar reaction vessel as used in Example 3, was placed 100 parts of the varnish (4), 37 parts of ricinolic acid and 23 parts of Ni acetate and the mixture was reacted for 6 hours at 120°~150° C., while removing the formed acetic acid out of the system. After cooling, 40 parts of xylene and 10 parts of n-butanol was added to obtain varnish (5) having a solid content of 45%. 100 parts of the varnish (5) and 20 parts of $\alpha,\omega$-bis (methoxy) polydimethyl siloxane (methoxy equivalent 248) were combined together and a coated plate (28) was prepared therefrom as in Example 8.

EXAMPLE 22

Into a similar reaction vessel as used in Example 3, 28 parts of Pb hydroxy stearate, 150 parts of dimethoxydiphenyl silane and 2 parts of dibutyl tin oxide were added and the mixture was reacted for 6 hours at 90°~120° C., while removing the formed methanol.

To this, methyl isobutyl ketone was added to obtain varnish (L) having a solid content of 40%. A coated plate (29) was prepared by using this varnish as in Example 8. Antifouling tests with these coated plates (20~29, and comparative coated plates 9~10) were carried out as previously mentioned.

Test results are shown in Table 6.

TABLE 5

| Composition of coting compositions | | | | | | |
|---|---|---|---|---|---|---|
| | | | | | Comp. Coated Plate | |
| For Coated Plate | 23 | 24 | 25 | 26 | 9 | 10 |
| varnish A | 40 | 10 | 30 | 60 | | 8 |
| varnish C | 45 | | | | 5 | |
| varnish D | | | | | | |
| ethylene-vinyl acetate copolymer | | 40 | | 20 | 45 | 45 |
| chlorinated rubber | | | 30 | | | |
| xylene | 15 | 40 | 30 | 10 | 40 | 35 |
| butanol | | 10 | 10 | 10 | 10 | 12 |

TABLE 6

| | Immersion Period (months) | | | | | | |
|---|---|---|---|---|---|---|---|
| Coated Plate | 3 | 6 | 9 | 12 | 18 | 24 | 30 |
| 20 | 0 | 0 | 0 | 0 | 0 | 0 | 0 |
| 21 | 0 | 0 | 0 | 0 | 0 | 0 | 5 |
| 22 | 0 | 0 | 0 | 0 | 0 | 0 | 0 |
| 23 | 0 | 0 | 0 | 0 | 0 | 0 | 5 |
| 24 | 0 | 0 | 0 | 0 | 5 | 40 | 100 |
| 25 | 0 | 0 | 0 | 0 | 5 | 10 | 100 |
| 26 | 0 | 0 | 0 | 0 | 0 | 5 | 20 |
| 27 | 0 | 0 | 0 | 0 | 0 | 0 | 10 |
| 28 | 0 | 0 | 0 | 0 | 0 | 5 | 10 |
| 29 | 0 | 0 | 0 | 0 | 0 | 0 | 0 |
| Comp. 9 | 0 | 0 | 5 | 80 | 100 | 100 | 100 |
| 10 | 0 | 0 | 30 | 100 | 100 | 100 | 100 |

The present polysiloxane resin having in its molecule a metal salt of an organic acid is gradually hydrolyzed and decomposed in an ionic atmosphere, e.g. salt water, and when utilized as a resinous vehicle for antifouling paint, a long-lasting antifouling effect can be expected therewith.

The coating composition is also characterized by having excellent recoatability.

What is claimed is:

1. A hydrolyzable silicone resin composition comprising a polysiloxane having at least one polyvalent metal ester group represented by either one of the following formulae:

—COO—$)_m$—M—$(R_2)_n$,

—$R_1$—COO—$)_m$—M—$(R_2)_n$ and

—$R_1$—$(CH_2)_p$—CH—$(CH_2)_q$—COO—$)_m$—M—$(R_2)_n$
　　　　　　　|
　　　　　　　$NH_2$ in which $R_2$ is a hydroxyl group, an alkoxyl group, an alkyl group, a halogen or an oxygen atom; $R_1$ is a bivalent organic residue of the formula:

$$-(CH_2)_a-\underset{\underset{R^2}{|}}{\overset{\overset{R^1}{|}}{C}}(CH_2)_b-,$$

wherein $R^1$ and $R^2$ each represent a hydrogen atom, an alkyl group having 1 to 10 carbon atoms or an alkene group having 2 to 10 carbon atoms; and a and b each represents 0 or an integer of 1 to 16, or of the formula:

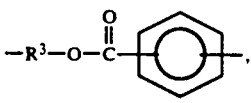

wherein $R^3$ represents an alkylene having 1 to 8 carbon atoms or an alkylene having 4 to 8 carbon atoms and containing an ether bond; p and q each is 0 or an integer of 1 to 8; m is an integer of 2 or more; n is 0 or an integer of 1 or more, providing that the sum of m and n is equal to the valence number of metal M; and M is a bivalent to tetravalent metal selected from the group consisting of Ti, Al, Mg, Zn, Pb, Zr, Cu, Ni, Co and Sn.

2. A hydrolyzable resin composition comprising a hydrolyzable silicone resin containing the following units:
   (a) a polyvalent metal salt of hydroxyl group containing organic acid or a resin having end hydroxyl groups and containing as a repeating unit a polyvalent metal salt of organic acid, and
   (b) a polysiloxane.

3. A composition according to claim 2 wherein the polyvalent metal salt of the hydroxyl group containing organic acid is a compound represented by the formula:

(HO—$R_1$—Y—$)_m$—M—$(R_2)_n$　　　(I)

in which $R_1$ is a bivalent organic residue of the formula:

$$-(CH_2)_a-\underset{\underset{R^2}{|}}{\overset{\overset{R^1}{|}}{C}}-(CH_2)_b-$$

wherein $R^1$ and $R^2$ each represent a hydrogen atom, an alkyl group having 1 to 10 carbon atoms or an alkene group having 2 to 10 carbon atoms; and a and b each represents 0 or an integer of 1 to 16, or of the formula:

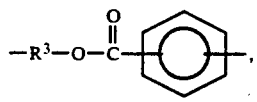

wherein $R^3$ represents an alkylene having 1 to 8 carbon atoms or an alkylene having 4 to 8 carbon atoms and containing an ether bond; Y is —$(CH_2)_p$—CH—$(CH_2)_q$—COO—　or　—COO—
　　　　　|
　　　　　$NH_2$ p and q each is 0 or an integer of 1 to 8; $R_2$ is a hydroxyl group, an alkoxyl group, an alkyl group, a halogen or oxygen atom; m is an integer of 2 or more; n is 0 or an integer of 1 or more, providing that the sum of m and n is equal to the valence number of the metal M; and M is a bivalent to tetravalent metal selected from the group consisting of Ti, Al, Mg, Zn, Pb, Zr, Cu, Ni, Co and Sn.

4. A composition according to claim 2 wherein the resin having end hydroxyl groups and containing as a repeating unit a polyvalent metal salt of organic acid is a polyester resin having end hydroxyl groups and containing in its main chain the polyvalent metal salt of an organic acid of the formula:

($R_1$—Y—$)_m$—M—$(R_2)_n$　　　(II)

as a repeating unit in which $R_1$ is a bivalent organic residue of the formula:

$$-(CH_2)_a-\underset{\underset{R^2}{|}}{\overset{\overset{R^1}{|}}{C}}-(CH_2)_b-$$

wherein $R^1$ and $R^2$ each represent a hydrogen atom, an alkyl group having 1 to 10 carbon atoms or an alkene group having 2 to 10 carbon atoms; and a and b each represents 0 or an integer of 1 to 16, or of the formula:

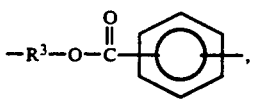

wherein $R^3$ represents an alkylene having 1 to 8 carbon atoms or an alkylene having 4 to 8 carbon atoms and containing an ether bond; Y is —$(CH_2)_p$—CH—$(CH_2)_q$—COO—　or　—COO—
　　　　　|
　　　　　$NH_2$ p and q each is 0 or an integer of 1 to 8; $R_2$ is a hydroxyl group, an alkoxyl group, an alkyl group, a halogen or oxygen atom; m is an integer of 2 or more; n is 0 or an integer of 1 or more, providing that the sum of m and n is equal to the valence number of metal M; and M is a bivalent to tetravalent metal selected from the group consisting of Ti, Al, Mg, Zn, Pb, Zr, Cu, Ni, Co and Sn.

5. A composition according to claim 2 wherein the resin having end hydroxyl groups and containing as a repeating unit a polyvalent metal salt of an organic acid is an acrylic resin having in its side chains an end hydroxyl group and the polyvalent metal salt of organic acid or the formula:

$$-R_1-Y-)_m-M-(R_2)_n \qquad (II)$$

as a repeating unit in which $R_1$ is a bivalent organic residue of the formula:

$$-(CH_2)_a-\underset{\underset{R^2}{|}}{\overset{\overset{R^1}{|}}{C}}-(CH_2)_b-$$

wherein $R^1$ and $R^2$ each represent a hydrogen atom, an alkyl group having 1 to 10 carbon atoms or an alkene group having 2 to 10 carbon atoms; and a and b each represents 0 or an integer of 1 to 16, or of the formula:

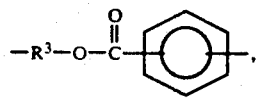

wherein $R^3$ represents an alkylene having 1 to 8 carbon atoms or an alkylene having 4 to 8 carbon atoms and containing an ether bond; Y is $$-(CH_2)_p-\underset{\underset{NH_2}{|}}{CH}-(CH_2)_q-COO- \quad \text{or} \quad -COO-$$

p and q each is 0 or an integer of 1 to 8; $R_2$ is a hydroxyl group, an alkoxyl group, an alkyl group, a halogen or oxygen atom; m is an integer of 2 or more; n is 0 or an integer of 1 or more, providing that the sum of m and n is equal to the valence number of metal M; and M is a bivalent to tetravalent metal selected from the group consisting of Ti, Al, Mg, Zn, Pb, Zr, Cu, Ni, Co and Sn.

6. A composition according to claim 2 wherein the polysiloxane is the compound represented by the formula:

$$RO-(R_4)_r-(O-\underset{\underset{R_6}{|}}{\overset{\overset{R_5}{|}}{Si}})_s-OR \qquad (III)$$

in which R is hydrogen or alkyl group; $R_4$ is a hydrocarbon having 2 to 18 carbon atoms, a hydrocarbon having 2 to 18 carbon atoms and containing an ether bond, or a hydrocarbon having 2 to 18 carbon atoms and containing an ester bond; $R_5$ and $R_6$ are the same or different from each other and each is hydrogen, $C_1-C_8$ alkyl, alkoxy or aryl group; r is 0 or 1; and s is an integer of 2 to 500.

7. A process for preparing a hydrolyzable silicone resin composition comprising reacting a polysiloxane having a carboxylic acid group or a carboxylic acid alkali metal salt group, and an oxide, hydroxide, halide, acetate or propionate of a polyvalent metal, or a polyvalent metal salt of a hydroxy group containing organic acid.

8. A process according to claim 7 wherein the polyvalent metal is selected from the group consisting of Ti, Al, Mg, Zn, Pb, Zr, Cu, Ni, Co and Sn.

9. A coating composition comprising as a resinous component a hydrolyzable silicone resin obtained by the polycondensation of a polyvalent metal salt of a hydroxyl group containing organic acid represented by the formula:

$$(HO-R_1-Y-)_m-M-(R_2)_n \qquad (I)$$

in which $R_1$ is a bivalent organic residue of the formula:

$$-(CH_2)_a-\underset{\underset{R^2}{|}}{\overset{\overset{R^1}{|}}{C}}-(CH_2)_b-,$$

wherein $R^1$ and $R^2$ each represent a hydrogen atom, an alkyl group having 1 to 10 carbon atoms or an alkene group having 2 to 10 carbon atoms; and a and b each represents 0 or an integer of 1 to 16, or of the formula:

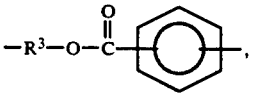

wherein $R^3$ represents an alkylene having 1 to 8 carbon atoms or an alkylene having 4 to 8 carbon atoms and containing an ether bond; Y is $$-(CH_2)_p-\underset{\underset{NH_2}{|}}{CH}-(CH_2)_q-COO-$$

or $$-COO-$$

p and q each is 0 or an integer of 1 to 8; $R_2$ is hydroxyl group, an alkoxyl group, an alkyl group, a halogen or oxygen atom; m is an integer of 2 or more; n is 0 or an integer of 1 or more, providing that the sum of m and n is equal to the valence number of metal M; and M is a bivalent to tetravalent metal selected from the group consisting of Ti, Al, Mg, Zn, Pb, Zr, Cu, Ni, CO and Sn, and a polysiloxane compound represented by the formula:

$$RO-(R_4)_r-(O-\underset{\underset{R_6}{|}}{\overset{\overset{R_5}{|}}{Si}})_s-OR \qquad (III)$$

in which R is hydrogen or an alkyl group; $R_4$ is a hydrocarbon having 2 to 18 carbon atoms, a hydrocarbon having 2 to 18 carbon atoms and containing an ether bond, or a hydrocarbon having to 18 carbon atoms and containing an ester bond: $R_5$ and $R_6$ are the same or different from each other and each is hydrogen, $C_1-C_8$ alkyl, alkoxy or an aryl group; r is 0 or 1; and s is an integer of 2 to 500.

10. A composition according to claim 9 wherein the hydrolyzable silicone resin content is at least 10% by weight of the total resinous component in the coating composition.

11. A two component coating composition consisting of one component comprising a polyvalent metal salt of a hydroxyl group containing organic acid represented by the formula:

$$(HO-R_1-Y-)_m-M-(R_2)_n \quad (I)$$

in which $R_1$ is a bivalent organic residue of the formula:

$$-(CH_2)_a-\underset{\underset{R^2}{|}}{\overset{\overset{R^1}{|}}{C}}-(CH_2)_b-,$$

wherein $R^1$ and $R^2$ each represent a hydrogen atom, an alkyl group having 1 to 10 carbon atoms or an alkene group having 2 to 10 carbon atoms; and a and b each represent 0 or an integer of 1 to 16, or of the formula:

$$-R^3-O-\overset{\overset{O}{\|}}{C}-\underset{}{\bigcirc}-,$$

wherein $R^3$ represents an alkylene having 1 to 8 carbon atoms or an alkylene having 4 to 8 carbon atoms and containing an ether bond; Y is $$-(CH_2)_p-\underset{\underset{NH_2}{|}}{CH}-(CH_2)_q-COO- \quad \text{or}$$

$$-COO-$$

p and q each is 0 or an integer of 1 to 8; $R_2$ is a hydroxyl group, an alkoxyl group, an alkyl group, a halogen or oxygen atom; m is an integer of 2 or more; n is 0 or an integer of 1 or more, providing that the sum of m and n is equal to the valence number of metal M; and M is bivalent to tetravalent metal selected from the group consisting of Ti, Al, Mg, Zn, Pb, Zr, Cu, Ni, Co and Sn and the other component comprising a polysiloxane compound represented by the formula:

$$RO-(R_4)_r-(O-\underset{\underset{R_6}{|}}{\overset{\overset{R_5}{|}}{Si}})_s-OR \quad (III)$$

in which R is hydrogen or an alkyl group; $R_4$ is a hydrocarbon having 2 to 18 carbon atoms, a hydrocarbon having 2 to 18 carbon atoms and containing an ether bond, or a hydrocarbon having 2 to 18 carbon atoms and containing an ester bond; $R_5$ and $R_6$ are the same or different from each other and each is hydrogen, a $C_1$-$C_8$ alkyl, an alkoxy or aryl group; r is 0 or 1; and s is an integer of 2 to 500.

12. A coating composition comprising as a resinous component a hydrolyzable silicone resin obtained by the polycondensation of a polyester resin having end hydroxyl groups and having in its main chain a repeating unit of a polyvalent metal salt of organic acid represented by the formula:

$$-R_1-Y-)_m-M-(R_2)_n \quad (II)$$

in which $R_1$ is a bivalent organic residue of the formula:

$$-(CH_2)_a-\underset{\underset{R^2}{|}}{\overset{\overset{R^1}{|}}{C}}-(CH_2)_b-,$$

wherein $R^1$ and $R^2$ each represent a hydrogen atom, an alkyl group having 1 to 10 carbon atoms or an alkene group having 2 to 10 carbon atoms; and a and b each represents 0 or an integer of 1 to 16, or of the formula:

$$-R^3-O-\overset{\overset{O}{\|}}{C}-\underset{}{\bigcirc}-,$$

wherein $R^3$ represents an alkylene having 1 to 8 carbon atoms or an alkylene having 4 to 8 carbon atoms and containing an ether bond; Y is $$-(CH_2)_p-\underset{\underset{NH_2}{|}}{CH}-(CH_2)_q-COO- \quad \text{or}$$

$$-COO-$$

p and q each is 0 or an integer of 1 to 8; $R_2$ is a hydroxyl group, an alkoxyl group, an alkyl group, a halogen or oxygen atom; m is an integer of 2 or more; n is 0 or an integer of 1 or more, providing that the sum of m and n is equal to the valence number of metal M; and M is a bivalent to tetravalent metal selected from the group consisting of Ti, Al, Mg, Zn, Pb, Zr, Cu, Ni, Co and Sn and a polysiloxane compound represented by the formula:

$$RO-(R_4)_r-(O-\underset{\underset{R_6}{|}}{\overset{\overset{R_5}{|}}{Si}})_s-OR \quad (III)$$

in which R is hydrogen or an alkyl group; $R_4$ is a hydrocarbon having 2 to 18 carbon atoms, a hydrocarbon having 2 to 18 carbon atoms and containing an ether bond, or a hydrocarbon having 2 to 18 carbon atoms and containing an ester bond; $R_5$ and $R_6$ are the same or different from each other and each is hydrogen, $C_1$-$C_8$ alkyl, alkoxy or an aryl group; r is 0 or 1; and s is an integer of 2 to 500.

13. A composition according to claim 12 wherein the hydrolyzable silicone resin content is at least 10% by weight of the total resinous component.

14. A two component coating composition consisting of one component comprising a polyester resin having end hydroxyl groups and having in its main chain a repeating unit of a polyvalent metal salt of organic acid represented by the formula:

$$(R_1-Y-)_m-M-(R_2)_n \quad (II)$$

in which $R_1$ is a bivalent organic residue of the formula:

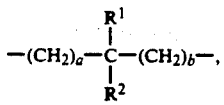

wherein $R^1$ and $R^2$ each represent a hydrogen atom, an alkyl group having 1 to 10 carbon atoms or an alkene group having 2 to 10 carbon atoms; and a and b each represents 0 or an integer of 1 to 16, or of the formula:

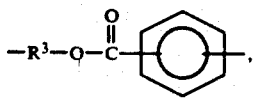

wherein $R^3$ represents an alkylene having 1 to 8 carbon atoms or an alkylene having 4 to 8 carbon atoms and containing an ether bond; Y is

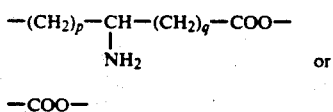

or

—COO— p and q each is 0 or an integer of 1 to 8; $R_2$ is a hydroxyl group, an alkoxyl group, an alkyl group, a halogen or oxygen atom; m is an integer of 2 or more; n is 0 or an integer of 1 or more, providing that the sum of m and n is equal to the valence number of metal M; and M is a bivalent to tetravalent metal selected from the group consisting of Ti, Al, Mg, Zn, Pb, Zr, Cu, Ni, Co and Sn and the other component comprising a polysiloxane compound represented by the formula:

$$RO-(R_4)_r-(O-\underset{\underset{R_6}{|}}{\overset{\overset{R_5}{|}}{Si}})_s-OR \qquad (III)$$

in which R is hydrogen or an alkyl group; $R_4$ is a hydrocarbon having 2 to 18 carbon atoms, a hydrocarbon having 2 to 18 carbon atoms and containing an ether bond, or a hydrocarbon having 2 to 18 carbon atoms and containing an ester bond; $R_5$ and $R_6$ are the same or different from each other and each is hydrogen, a $C_1$-$C_8$ alkyl, an alkoxy or aryl group; r is 0 or 1; and s is an integer of 2 to 500.

15. A coating composition comprising as a resinous component a hydrolyzable silicone resin obtained by the polycondensation of an acrylic resin having in its side chains an end hydroxyl group and a repeating unit of a polyvalent metal salt or organic acid represented by the formula:

$$-R_1-Y-)_m-M-(R_2)_n \qquad (II)$$

in which $R_1$ is a bivalent organic residue of the formula:

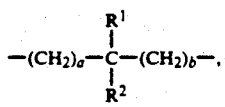

wherein $R^1$ and $R^2$ each represent a hydrogen atom, an alkyl group having 1 to 10 carbon atoms or an alkene group having 2 to 10 carbon atoms; and a and b each represents 0 or an integer of 1 to 16, or of the formula:

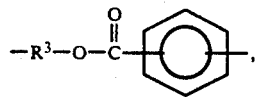

wherein $R^3$ represents an alkylene having 1 to 8 carbon atoms or an alkylene having 4 to 8 carbon atoms and containing an ether bond; Y is

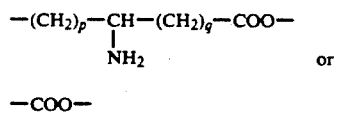

or

—COO— p and q each is 0 or an integer of 1 to 8; $R_2$ is a hydroxyl group, an alkoxyl group, an alkyl group, a halogen or oxygen atom; m is an integer of 2 or more; n is 0 or an integer of 1 or more, providing that the sum of m and n is equal to the valence number of metal M; and M is a bivalent to tetravalent metal selected from the group consisting of Ti, Al, Mg, Zn, Pb, Zr, Cu, Ni, Co and Sn and a polysiloxane compound represented by the formula:

$$RO-(R_4)_r-(O-\underset{\underset{R_6}{|}}{\overset{\overset{R_5}{|}}{Si}})_s-OR \qquad (III)$$

in which R is hydrogen or an alkyl group; $R_4$ is a hydrocarbon having 2 to 18 carbon atoms, a hydrocarbon having 2 to 18 carbon atoms and containing an ether bond, or a hydrocarbon having 2 to 18 carbon atoms and containing an ester bond; $R_5$ and $R_6$ are the same or different from each other and each is hydrogen, a $C_1$-$C_8$ alkyl, an alkoxy or aryl group; r is 0 or 1; and s is an integer of 2 to 500.

16. A composition according to claim 15 wherein the hydrolyzable silicone resin content is at least 10% by weight of the total resinous component.

17. A two component coating composition consisting of one component comprising an acrylic resin having in its side chains an end hydroxyl group and a repeating unit of a polyvalent metal salt of organic acid represented by the formula:

$$(R_1-Y-)_m-M-(R_2)_n \qquad (ii)$$

in which $R_1$ is a bivalent organic residue of the formula:

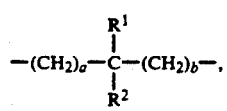

wherein $R^1$ and $R^2$ each represent a hydrogen atom, an alkyl group having 1 to 10 carbon atoms or an alkene group having 2 to 10 carbon atoms; and a and b each represents 0 or an integer of 1 to 16, or of the formula:

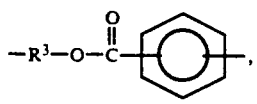

wherein $R^3$ represents an alkylene having 1 to 8 carbon atoms or an alkylene having 4 to 8 carbon atoms and containing an ether bond; Y is

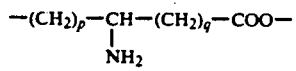 or

p and q each is 0 or an integer of 1 to 8; $R_2$ is a hydroxyl group, an alkoxyl group, an alkyl group, a halogen or oxygen atom; m is an integer of 2 or more; n is 0 or an integer of 1 or more, providing that the sum of m and n is equal to the valence number of metal M; and M is a bivalent to tetravalent metal selected from the group consisting of Ti, Al, Mg, Zn, Pb, Zr, Cu, Ni, Co and Sn and the other component comprising a polysiloxane compound represented by the formula:

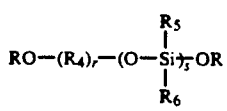 (III)

in which R is hydrogen or an alkyl group; $R_4$ is a hydrocarbon having 2 to 18 carbon atoms, a hydrocarbon having 2 to 18 carbon atoms and containing an ether bond, or a hydrocarbon having 2 to 18 carbon atoms and containing an ester bond; $R_5$ and $R_6$ are the same or different from each other and each is hydrogen, a $C_1$-$C_8$ alkyl, an alkoxy or aryl group; r is 0 or 1; and s is an integer of 2 to 500.

18. A two component coating composition consisting of one component comprising an end carboxyl bearing modified silicone resin obtained by the reaction of a polysiloxane compound of the formula:

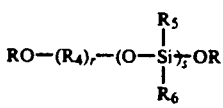 (III)

in which R is hydrogen or an alkyl group; $R_4$ is a hydrocarbon having 2 to 18 carbon atoms, a hydrocarbon having 2 to 18 carbon atoms and containing an ether bond, or a hydrocarbon having 2 to 18 carbon atoms and containing an ester bond; $R_5$ and $R_6$ are the same or different from each other and each is hydrogen, a $C_1$-$C_8$ alkyl, an alkoxy or aryl group; r is 0 or 1; and s is an integer of 2 to 500, and a hydroxy organic acid of the formula:

HO—$R_1$—Y—H (IV)

in which $R_1$ is a bivalent organic residue of the formula:

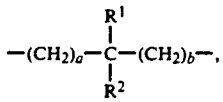

wherein $R^1$ and $R^2$ each represent a hydrogen atom, an alkyl group having 1 to 10 carbon atoms or an alkene group having 2 to 10 carbon atoms; and a and b each represents 0 or an integer of 1 to 16, or of the formula:

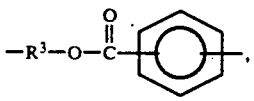

wherein $R^3$ represents an alkylene having 1 to 8 carbon atoms or an alkylene having 4 to 8 carbon atoms and containing an ether bond; Y is

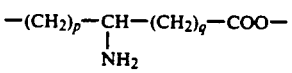 or

p and q each is 0 or an integer of 1 to 8, and the other component comprising an oxide, hydroxide, alkoxide, halide or organic acid salt of a bivalent to tetravalent metal selected from the group consisting of Ti, Al, Mg, Zn, Pb, Zr, Cu, Ni, Co and Sn.

19. A two component coating composition consisting of one component comprising an end carboxyl bearing modified silicone resin obtained by the reaction of a di-alkoxysilane compound of the formula:

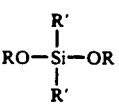 (V)

in which R is an alkyl group and R' are the same or different from each other and each is hydrogen, alkyl or aryl group and a hydroxy organic acid of the formula:

HO—$R_1$—Y—H (IV)

in which $R_1$ is a bivalent organic residue of the formula:

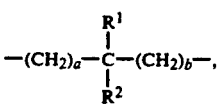

wherein $R^1$ and $R^2$ each represent a hydrogen atom, an alkyl group having 1 to 10 carbon atoms or an alkene group having 2 to 10 carbon atoms; and a and b each represents 0 or an integer of 1 to 16, or of the formula:

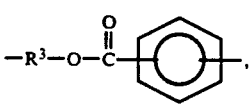

wherein $R^3$ represents an alkylene having 1 to 8 carbon atoms or an alkylene having 4 to 8 carbon atoms and containing an ether bond; Y is

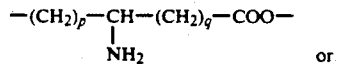 or

—COO— p and q each is 0 or an integer of 1 to 8, and the other component comprising an oxide, hydroxide, alkoxide, halide or organic acid salt of a bivalent to tetravalent metal selected from the group consisting of Ti, Al, Mg, Zn, Pb, Zr, Cu, Ni, Co and Sn.

* * * * *